April 3, 1956     R. L. PETERSON     2,740,933
CONTROL SYSTEM USING TWO SATURABLE REACTORS
IN A CONSTANT CURRENT CIRCUIT
Filed Jan. 26, 1953     3 Sheets-Sheet 1

INVENTOR.
ROBERT LEROY PETERSON
BY Lyon & Lyon
ATTORNEYS

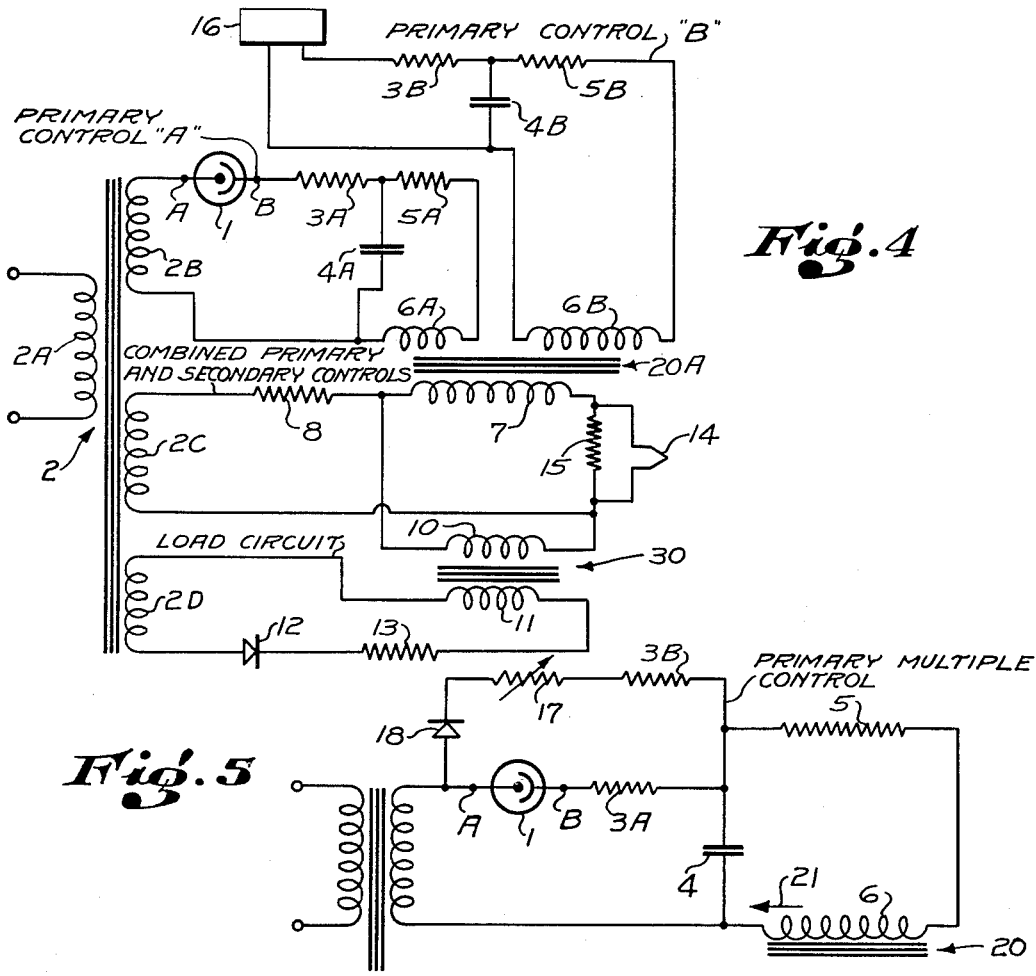
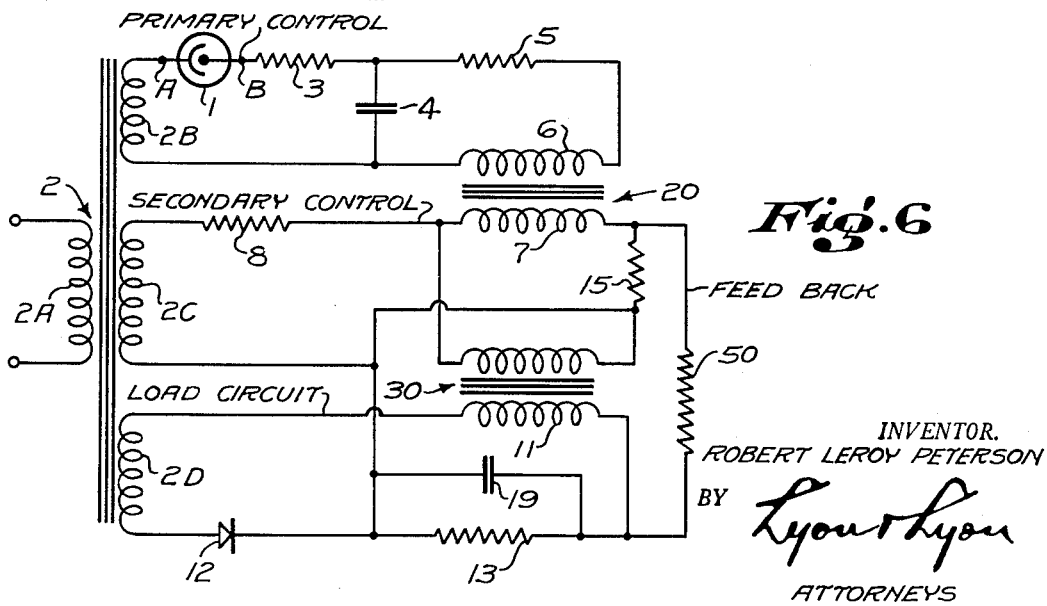

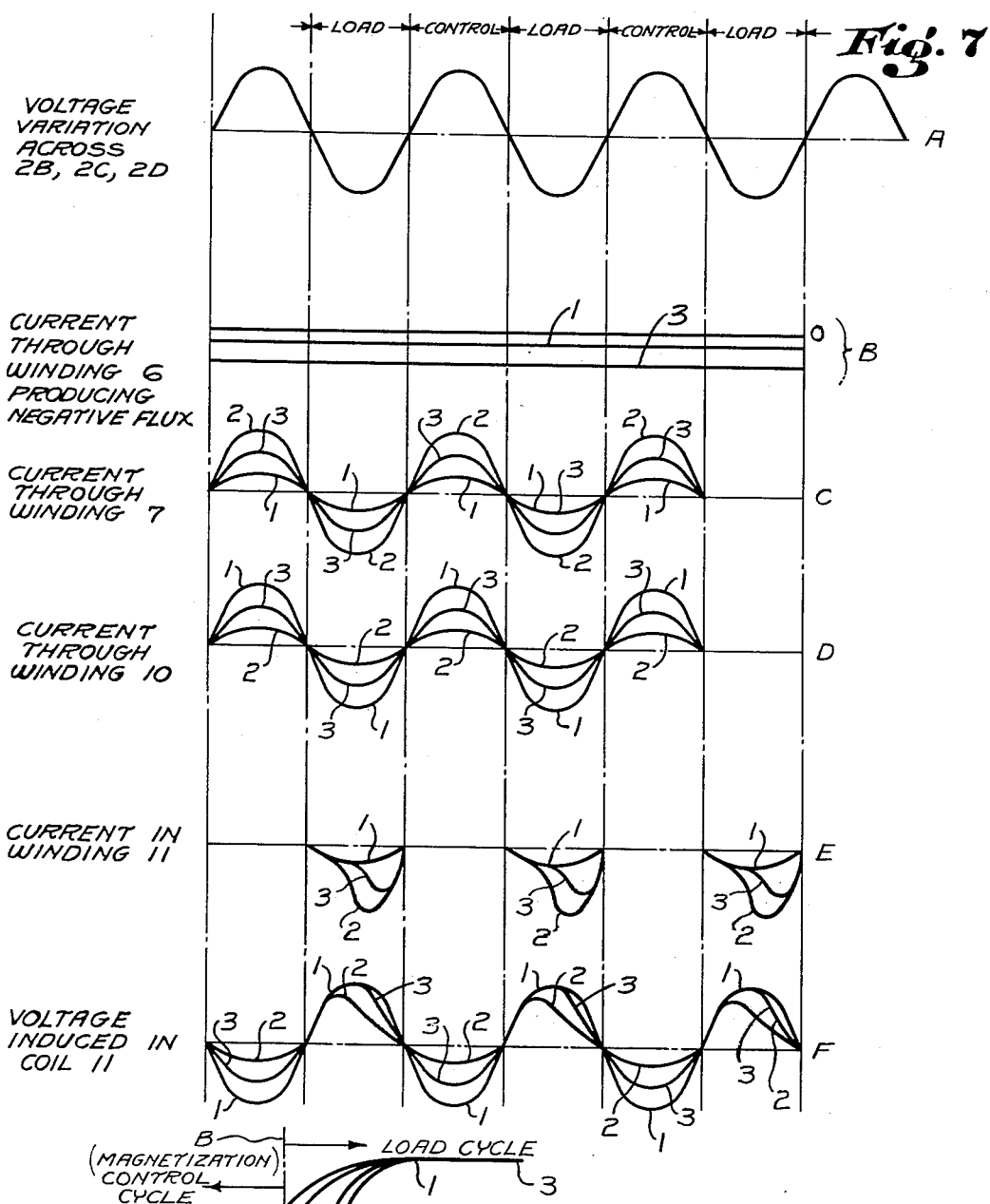
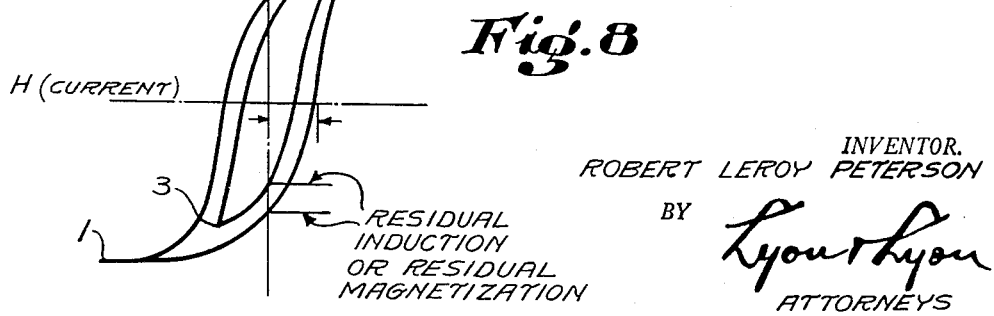

United States Patent Office 2,740,933
Patented Apr. 3, 1956

2,740,933
CONTROL SYSTEM USING TWO SATURABLE REACTORS IN A CONSTANT CURRENT CIRCUIT

Robert L. Peterson, North Hollywood, Calif., assignor to General Controls Co., Glendale, Calif., a corporation of California Application January 26, 1953, Serial No. 333,193

11 Claims. (Cl. 321—25)

The present invention relates to control systems and more specifically to a magnetic amplifier which is sensitive to extremely low energy level signals as are obtained, for example, from photo-emissive and photo-conductive cells, thermocouples and the like.

In general, the present invention as described herein involves the use of two saturable reactors. One of such saturable reactors has one winding thereof in a primary control circuit energized with unidirectional current from a control element of the character mentioned above and has a second winding in a so-called secondary control circuit. The other saturable reactor has a third winding connected in parallel with the second winding in a constant current secondary control circuit, while the other winding of the second reactor is connected in a load circuit through which a unidirectional current in the form of half-wave pulses flow. Thus, a first unidirectional current flows through the primary control circuit, and a second unidirectional current flows through the load circuit, but an alternating current flows through the constant current secondary control circuit. The unidirectional currents in the primary control circuit and the load current circuit produce magnetization of the first and second reactors respectively in such a manner that there is what may be termed to be a control cycle during which unidirectional current flows through the first-mentioned winding; and a so-called load cycle during which half-wave pulses flow through the load circuit of such magnitude as determined by the magnetic state of the core of the second saturable reactor as established during the control cycle.

It is therefore a general object of the present invention to provide improved means and techniques for accomplishing the above-mentioned functions and results.

A specific object of the present invention is to provide a control system of this character incorporating a magnetic amplifier which uses components inherently stable so that the system is inherently stable.

Another specific object of the present invention is to provide a control system of this character in which supply voltage variations have a minimum effect since the same supply voltage may be used to supply energy to both the load and control circuits.

Another specific object of the present invention is to provide a control system of this character which is especially well suited for safety controls since either an open circuit or a short circuit in the external leads which connect the above-mentioned control element in the amplifier circuit will not produce full energization of the load in the load circuit; i. e., an open circuit or a short circuit causes an output equivalent to no signal.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 3:
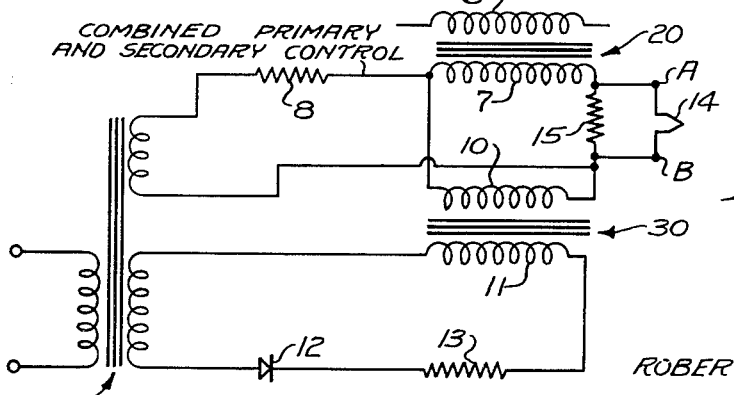

Figure 3 shows another modified arrangement embodying features of the present invention allowing a dual control and having an additional thermocouple connected with the windings 7 and 10 so that, in effect, there is a combined primary and secondary control circuit. It is noted that winding 6 is not necessary if a single control is desired from the thermocouple.

Figure 4 shows a further modified arrangement, also embodying features of the present invention, in which it is controllable by two control elements, i. e., the phototube 1 and the thermocouple 16, in a dual primary control circuit.

Figure 5 shows a further modified arrangement, also embodying features of the present invention, in which a multiple control is provided in the primary control circuit.

Figure 1:
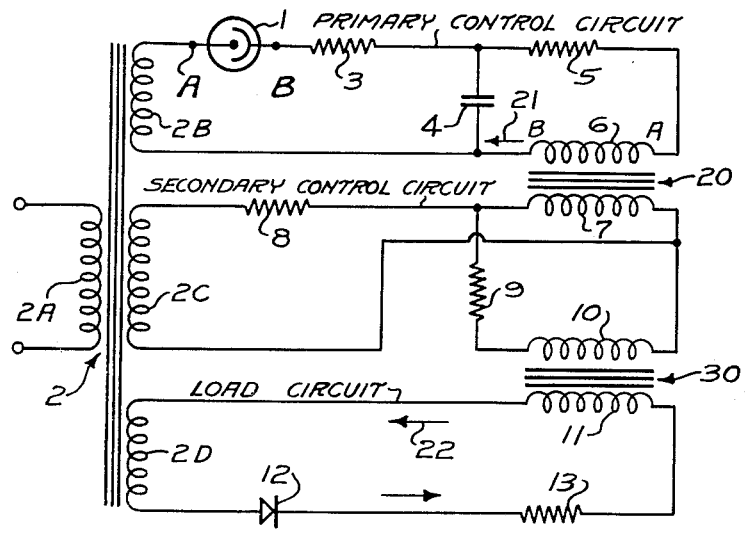
Figure 1 is a schematic representation of a circuit embodying features of the present invention.

Figure 6 shows a still further modified arrangement similar in some respects to the arrangement shown in Figure 1 but, in addition thereto, incorporating a feedback path between the load circuit and the secondary control circuit, as well as a filter 19 for the load 13.

Figure 7 shows in graphical form various wave forms existing in the arrangement shown in Figure 1 for facilitating the description of the operation, functioning and results produced by the same, although it is understood that the graphs shown therein are not intended to represent electrical quantities quantitatively but qualitatively only.

Figure 8 serves to illustrate the change in residual magnetization existing in the magnetic core of the reactor 30 in Figure 1 after a control cycle as described herein, as a function of the intensity of current flowing through the winding 10 during such control cycle.

Referring to the drawings, since each of the six different arrangements herein has a so-called primary control circuit, a secondary control circuit and a load circuit, corresponding elements which comprise such circuits have identical reference numerals.

Referring specifically to Figure 1, a single power transformer 2 comprising primary winding 2A and secondary windings 2B, 2C and 2D serves to energize the three circuits designated therein. The secondary winding 2B is serially connected with the phototube 1, the filter resistances 3 and 5 and winding 6 of the saturable reactor 20 such that a unidirectional current flows from the terminal A to the terminal B of winding 6 in the direction indicated by the arrow 21, the phototube 1 being poled to produce such unidirectional current flow. In order to filter the alternating current component of the half-wave rectified pulse, the filter condenser 4 has one of its terminals connected to the junction points of resistances 3 and 5 and the other one of its terminals connected to the terminal B.

The secondary control circuit includes the secondary winding 2C, current limiting resistance 8, winding 7 of reactor 20, winding 10 of saturable reactor 30 and resistance 9. It is noted that the winding 7 comprises one arm which is connected in shunt with a second arm comprising the serially connected resistance 9 and winding 10. The current which flows in the secondary control circuit is determined substantially by the magnitude of voltage appearing across the winding 2C and the magnitude of the resistance 8 since the resistance 8 has an impedance or resistance substantially higher than the combined impedance of the elements 7, 9 and 10. It should be carefully noted that, while the current flowing through the resistance 8 is of substantially constant magnitude, its division in the arm 7 on the one hand and the arm 9, 10 on the other hand is dependent upon the relative impedances of the winding 7 and 10, each of which is subject to change depending upon the magnetic state of the iron core of the reactors 20 and 30 respectively.

The load circuit comprises the serially connected secondary winding 2D, saturable reactor winding 11, the load 13 and the rectifier 12, the rectifier 12 being poled so that current in the form of half-wave pulses flows in the direction indicated by the arrows 22. While the load 13 is represented as a resistance, it is well understood that this is symbolical only, and the load may in fact comprise a relay, a solenoid, a clutch, a heating resistance and the like. The various voltages and currents and their relationship to each other are illustrated in a qualitative manner in Figure 7, the polarity of the various windings 6, 7, 10 and 11 being such that the conditions indicated in Figure 7 exist.

In Figure 7, the representation A indicates the sine wave voltage which may be considered qualitatively to exist across either one of the windings 2B, 2C or 2D. The representation B serves to represent the current flow through winding 6 over three different conditions discussed below in connection with representation C. The representation C, comprising a series of three curves, indicates the current flow through winding 7 under three corresponding conditions: the curve 1 represents the current when the phototube 1 is not illuminated; the curve 2 indicates the condition existing immediately after the phototube 1 has been illuminated; and the curve 3 represents a steady state condition existing after the phototube 1 has been illuminated for a relatively long period of time. The representation D in Figure 7, comprising a series of three curves, represents current flow through the winding 10, and the curves designated 1, 2 and 3 represent the same conditions as explained above in connection with curves 1, 2 and 3 of the representation C. The representation E, comprising three curves showing half-wave pulses, indicates the current flow in winding 11 under the three corresponding conditions mentioned above in connection with representations C and D. The representation F in Figure 7 indicates the voltage induced in coil 11 by winding 10 under the corresponding three conditions mentioned above.

When the phototube 1 is not illuminated, there is substantially no current flowing through the winding 6, and this condition is indicated by the curve 1 in representation B. Immediately after the phototube 1 is illuminated, a maximum current flows through the winding 6, and this condition is indicated by the curve 3 in representation B. This current in winding 6 serves to saturate the core of the reactor 20 so as to decrease the impedance of winding 7 to thereby alter the division of current flow in the arm 7 on the one hand and in the arm 9, 10 on the other hand, it being remembered that a constant current flows through the resistance 8.

Initially when the phototube 1 is not illuminated, an alternating current of relatively small magnitude flows through the winding 7 as indicated by the curve 1 in representation C; and, conversely, a relatively large current flows through the winding 10 as indicated by the curve 1 in representation D. It is noted that during the control cycle the core of reactor 30 is carried to a peak magnetization as shown in Figure 8. At the beginning of the load cycle the core has a residual magnetization as shown in Figure 8. The load current is not affected immediately at the beginning of the load cycle but rather in the load cycle after the core of reactor 30 has become saturated. Figure 8 shows this effect of saturation allowing a larger current flow.

Thus, immediately after the phototube 1 is fully illuminated, the conditions indicated by curve 2 in representations B, C, D, E and F exist.

It is observed in Figure 7 that, due to the fact that the current flows in the load circuit in half-wave pulses, there may be considered to be a load cycle during which such half-wave pulses flow and a control cycle during which there is no current flow in winding 11.

During the control cycle, the core of the saturable reactor 30 is not influenced by conditions in winding 11 since there is no current flowing in winding 11. Thus, the state of magnetization of the core of reactor 30 at the end of the control cycle is determined by the magnitude of the current flowing through such winding 10 during the control cycle. The higher the peak value of the current flowing through the winding 10 during the control cycle, the higher will be the residual magnetization at the end of the control cycle. This condition is illustrated graphically in Figure 8 which shows a typical hysteresis loop for the iron core of reactor 30.

It is noted that the current flowing in winding 10 during the control cycle produces an opposite magnetic effect in the core of reactor 30 from that subsequently produced as a result of the current flowing in winding 11. Thus, in other words, it may be categorically stated that the currents in windings 10 and 11 produce opposite magnetic effects on the magnetization of the core of reactor 30 so that a decrease in current in winding 10 places the magnetic core in a more favorable condition for the flow of a subsequent increased current through winding 11. It may also be categorically stated that the current in winding 10 during the load cycle has no direct effect on the load circuit during this particular period of time since the ampere turns of magnetization produced by the current in winding 11 are predominantly greater than the ampere turns flowing in winding 10 during this same period of time. Thus, it is observed that, as an immediate result of the illumination of phototube 1, the current through winding 10 is decreased and the current through winding 11 is increased as represented by the curves 2 in representations D and E. Subsequently, the current flowing through winding 11 progressively changes until it reaches the steady state condition represented by the curve 3 in representation E. During such transition indicated by the curve 2 and the curve 3, a certain transitory condition may exist which can be accentuated or effectively eliminated by decreasing or increasing the magnitude of the impedance of elements 9 or 10, or both of them. This transitory effect results from the fact that, immediately after the flow of current is increased in winding 11, the impedance of winding 10 is lowered so that a redistribution of the constant current flowing through resistance 8 is required; i. e., the alternating current through winding 7 is decreased as a result of the decrease in impedance of winding 10.

Thus, ultimately after a matter of, for example, several seconds, a steady state condition results and this condition is indicated by the curves 3 in representations B, C, D, E and F. The overall circuit effect caused by this transitory action is to increase the circuit sensitivity and to introduce a transient in the load current flowing through winding 11 that may last for several seconds. Inasmuch as this transient is positive and is controllable, being controllable, for example, by the resistance of element 9 or by the resistance in winding 10, or both, it may be used to serve some useful purpose, or, as explained previously, it may be substantially eliminated.

It may thus be seen from the foregoing that the load current flowing through the winding 11 is controlled by the secondary control circuit or may be controlled by the primary control circuit which includes the phototube 1. The load current is unidirectional but does contain variations, i. e., ripple. In those instances where it is desirable to filter the ripple out of the load, this may be done by conventional methods of filtering using, for example, a bypass condenser connected in shunt with the load 13, as shown in Figure 6, without disturbing the circuit operation.

Although the circuit illustrated in Figure 1 is controlled by a photocell, it is by no means limited to this type of control. As a matter of fact, any similar device may be directly connected to input terminals A and B, even though the reverse conduction of the device is relatively high. One such device is the flame conduction rod; also, the amplifier shown in Figure 1 can be made responsive to impedance, as described hereinafter.

Figure 2:
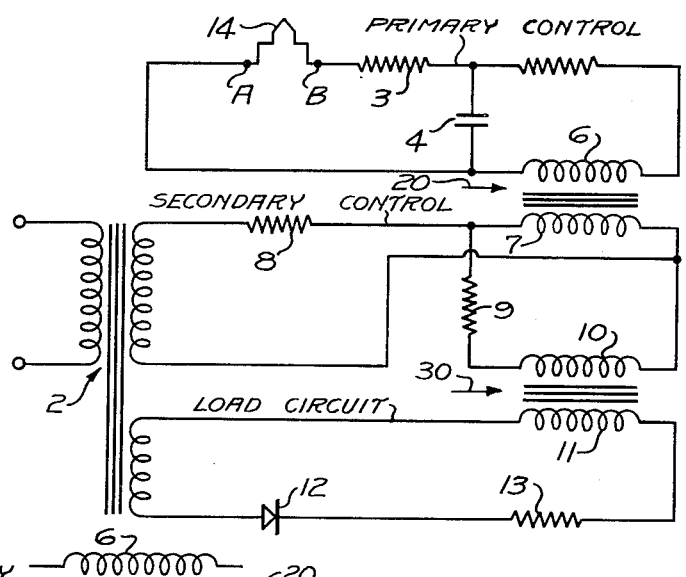
Figure 2 shows a modified arrangement embodying features of the present invention which employs a thermocouple instead of a photoelectric cell as shown in Figure 1.

Further, a voltage generating device, such as a photoemissive cell or a thermocouple, may be used as a control. In such case, the alternating voltage supply which is provided by the secondary winding 2B is not required, as illustrated in the modified form shown in Figure 2 wherein the secondary winding 2B is eliminated and the phototube 1 is replaced by a thermocouple 14 connected to the same winding 2B. The function, operation and results produced by the modification shown in Figure 2 are the same as those using the circuit shown in Figure 1.

With respect to Figure 3, a voltage generating device such as a thermocouple 14 may be connected in shunt with the resistance 15. The reactor winding 6 in Figure 3 may be connected to a separate primary control circuit of the character illustrated either in Figure 1 or in Figure 2 to produce generally the same functions and results as described above. It is observed in Figure 3 that a combined primary and secondary control circuit is provided by connecting the thermocouple 14. Such secondary control circuit is a constant current circuit as described above, the current being limited substantially by the magnitude of resistance 8; and, although the function of the resistance 9 of Figures 1 and 2 is replaced by the resistor 15 in Figure 3, the operation of the circuitry is otherwise the same. It is observed that an increase in the voltage developed by the thermocouple 14 of Figure 3 lowers the impedance of winding 7 in the same manner as if a current flowed through the winding 6, as described above, so as to require a redistribution of the constant current flowing through resistance 8.

This arrangement shown in Figure 3 is developed further in the modification shown in Figure 4 in that the winding 6 of Figure 3 comprises in fact two windings 6A and 6B, each controlled separately by different control elements, namely, the phototube 1 and the control element 16 respectively. It is observed that each one of the elements 1, 14 and 16 controls the intensity of the current flowing through the load 13.

In Figure 5, the primary control circuit may take the form shown therein with the secondary and load circuits being as illustrated in Figure 1. In Figure 5 both the phototube 1 and the variable impedance 17 serve to control the continuous current in winding 6 which, in turn, controls the power in the load. The variable impedance 17, shown in the form of a resistance, is serially connected with the rectifier 18 and resistance 3B in an arm which is connected in shunt with the arm comprising phototube 1 and resistance 3A. The rectifier 18 is poled so that it produces current through the winding 6 in the same direction as that produced by the phototube 1.

Figure 6 shows an arrangement functioning and operating identical to that described in connection with Figure 1, but in this instance a feedback path which includes a resistance 50 is provided. This resistance 50 has one of its terminals connected to the junction point of winding 7 and resistance 15 and the other one of its terminals connected to the junction point of load 13 with winding 11. Also, the junction point of resistance 15 and rectifier 12 is connected to the junction point of resistance 15 with winding 10. In such case, the voltage developed across the load 13 is applied through resistance 50 to the resistance 15 to produce the same result as produced by the thermocouple 14 in Figures 3 and 4. In other words, instead of deriving a voltage from a thermocouple 14, as shown in Figure 4, and applying the same to the resistance 15, a voltage developed across the load 13 may be substituted for such thermocouple voltage, as shown in Figure 6. The filter condenser 19 is used to reduce ripple in the load 13. Instead of having the feedback responsive to load voltage, it is obvious that the amount of feedback desired in load 15 may be made responsive to load current, if desired.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a system of the character described, a first saturable reactor having a first and a second winding, a second saturable reactor having a third and a fourth winding, a source of control voltage coupled to said first winding in a primary control circuit, a parallel circuit including said second winding and third winding in opposite arms thereof, impedance means connected in one of said arms to establish a division of current flow in said second and third windings, a source of alternating voltage, a current limiting impedance serially connected with said parallel circuit in a secondary control circuit, means coupling said source of alternating voltage to said secondary control circuit, rectifying means serially connected with said fourth winding in a load circuit, and means coupling said source of alternating voltage to said load circuit.

2. In a system of the character described, a first saturable reactor having a first and a second winding, a second saturable reactor having a third and a fourth winding, a source of control voltage coupled to said first winding in a primary control circuit, a parallel circuit including said second winding and third winding in opposite arms thereof, means connected in one of said arms for establishing a division of current flow in said second and third windings, current limiting means serially connected with said parallel circuit in a secondary control circuit, rectifying means serially connected with said fourth winding in a load circuit, and a source of alternating voltage coupled to said secondary control circuit and to said load circuit.

3. The arrangement set forth in claim 2 in which said source of control voltage includes a control device for developing a unidirectional voltage.

4. The arrangement set forth in claim 2 wherein said current division establishing means comprises an impedance serially connected with one of said second and third windings and a control device for developing a unidirectional voltage coupled thereto.

5. The arrangement set forth in claim 2 wherein said first winding in fact comprises a pair of windings each being coupled to a separate control device for supplying a unidirectional current to a corresponding one of said pair of windings.

6. The arrangement set forth in claim 2 wherein said source of control voltage includes an adjustable impedance.

7. The arrangement set forth in claim 2 wherein means are coupled between said load circuit and said secondary control circuit to produce feedback.

8. In a system of the character described, a saturable reactor having a first winding, a second winding and a magnetic core, a load serially connected with said first winding in a load circuit, means supplying energy to said load circuit in the form of time spaced pulses, said second winding being connected in a control circuit, means coupled to said control circuit for supplying current thereto during the interval between said spaced pulses for controlling and determining the magnetic state of said core at the beginning of each of said spaced pulses and thereby the energy supplied to said load.

9. In a system of the character described, a first saturable reactor having a first and a second winding, a second saturable reactor having a third and a fourth winding and a magnetic core, a source of control voltage coupled to said first winding in a primary control circuit, a parallel circuit including said second winding and third winding in opposite arms thereof, means connected in one of said arms for establishing a division of current flow in said second and third windings, current limiting means serially connected with said parallel circuit in a secondary control circuit, a load serially connected with said fourth winding in a load circuit, means supplying energy to said load circuit in the form of time spaced pulses, means coupled to said secondary control circuit to supply energy thereto during the interval between said spaced pulses for controlling and determining the magnetic state of said core at the beginning of each of said spaced pulses and thereby the energy supplied to said load.

10. The arrangement set forth in claim 9 wherein means couple said load to said secondary control circuit to feed a current to said third winding in an amount depending upon energization of said load circuit.

11. In a system of the character described, a primary control circuit, a load circuit, a secondary control circuit, a first saturable reactor coupling said primary control circuit to said secondary control circuit, a second saturable reactor coupling said secondary control circuit to said load circuit, a source of alternating current, rectifying means, said load circuit including said source, said rectifying means and a first winding of said second saturable reactor, a source of control voltage, said primary control circuit including said source of control voltage and a first winding of said first saturable reactor, a second winding of each of said first and second saturable reactors being connected in shunt with each other in a parallel circuit and being coupled to said source of alternating voltage, an impedance serially connected between said source of alternating voltage and said parallel circuit, and said parallel circuit including in one arm thereof an impedance serially connected with one of said second windings and including in the other arm thereof the other one of said second windings.

References Cited in the file of this patent

UNITED STATES PATENTS

| | | |
|---|---|---|
| 1,977,193 | Logan | Oct. 16, 1934 |
| 2,118,440 | Logan | May 24, 1938 |
| 2,306,998 | Claesson | Dec. 29, 1942 |
| 2,548,579 | Bedford | Apr. 10, 1951 |
| 2,628,340 | Potter | Feb. 10, 1953 |